United States Patent
Cheng

(10) Patent No.: US 8,690,241 B2
(45) Date of Patent: Apr. 8, 2014

(54) FASTENING ASSEMBLY AND CUSHION HAVING FASTENING ASSEMBLY

(75) Inventor: Sen-Mei Cheng, Ho Mei Town (TW)

(73) Assignee: Taiwan Paiho Limited, Chang Hua County (TW)

( * ) Notice: Subject to any disclaimer, the term of this patent is extended or adjusted under 35 U.S.C. 154(b) by 202 days.

(21) Appl. No.: 13/472,923

(22) Filed: May 16, 2012

(65) Prior Publication Data

US 2012/0223556 A1    Sep. 6, 2012

Related U.S. Application Data

(63) Continuation-in-part of application No. 12/425,151, filed on Apr. 16, 2009, now abandoned.

(30) Foreign Application Priority Data

Dec. 26, 2008 (TW) ............................... 97150797 A

(51) Int. Cl.
*A44B 18/00* (2006.01)
*A47B 31/02* (2006.01)

(52) U.S. Cl.
USPC ................................ 297/219.1; 297/218.2

(58) Field of Classification Search
CPC .............. A44B 18/00; A44B 18/0073; A44B 18/0076; A44B 18/008; A47C 31/003; A47C 31/02
USPC ................ 297/218.2, 219.1, 283.1; 428/100
See application file for complete search history.

(56) References Cited

U.S. PATENT DOCUMENTS

| | | | | |
|---|---|---|---|---|
| 4,842,916 A * | 6/1989 | Ogawa et al. | ................. | 428/100 |
| 5,061,540 A | 10/1991 | Cripps | | |
| 5,180,618 A * | 1/1993 | Kessler et al. | ................ | 428/100 |
| 5,422,156 A * | 6/1995 | Billarant | ....................... | 428/100 |
| 5,766,723 A * | 6/1998 | Oborny et al. | ................ | 428/100 |
| 5,840,398 A * | 11/1998 | Billarant | ....................... | 428/100 |
| 5,900,303 A * | 5/1999 | Billarant | ....................... | 428/100 |
| 5,922,436 A * | 7/1999 | Banfield et al. | ............... | 428/100 |
| 5,945,193 A * | 8/1999 | Pollard et al. | ................. | 428/100 |
| 6,129,970 A | 10/2000 | Kenney | | |
| 7,077,473 B2 * | 7/2006 | Demain et al. | ........... | 297/228.13 |
| 7,431,976 B2 * | 10/2008 | Hermann et al. | ............. | 428/100 |
| 2002/0043833 A1 * | 4/2002 | Michot et al. | .............. | 297/218.2 |
| 2005/0189811 A1 | 9/2005 | Herrmann | | |

FOREIGN PATENT DOCUMENTS

JP       2002078512 A    3/2002

* cited by examiner

*Primary Examiner* — Philip Gabler
(74) *Attorney, Agent, or Firm* — Ming Chow; Sinorica, LLC

(57) ABSTRACT

A fastening assembly and a cushion having the same are disclosed. The fastening assembly includes a first band, a second band, and a third band. The first band has a first surface protrudingly provided with a plurality of hooks, and a second surface provided with a magnetic layer. The second band is made of a sponge material and is provided lengthwise with a central concave portion and bilaterally with sidewalls. The first band is placed on the central concave portion. The depth of the central concave portion is greater than the thickness of the first band plus the hooks. The third band is bonded to a bottom surface of the second band with another magnetic layer disposed between the second band and the third band.

6 Claims, 3 Drawing Sheets

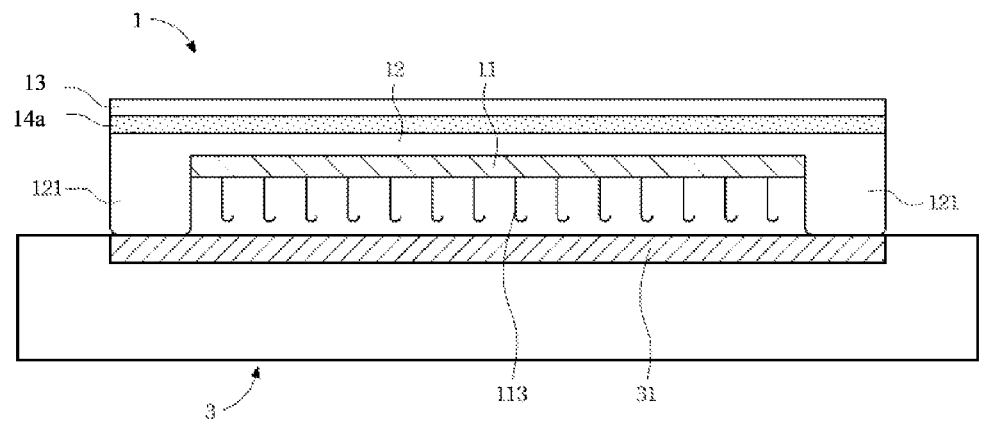
Fig. 1E
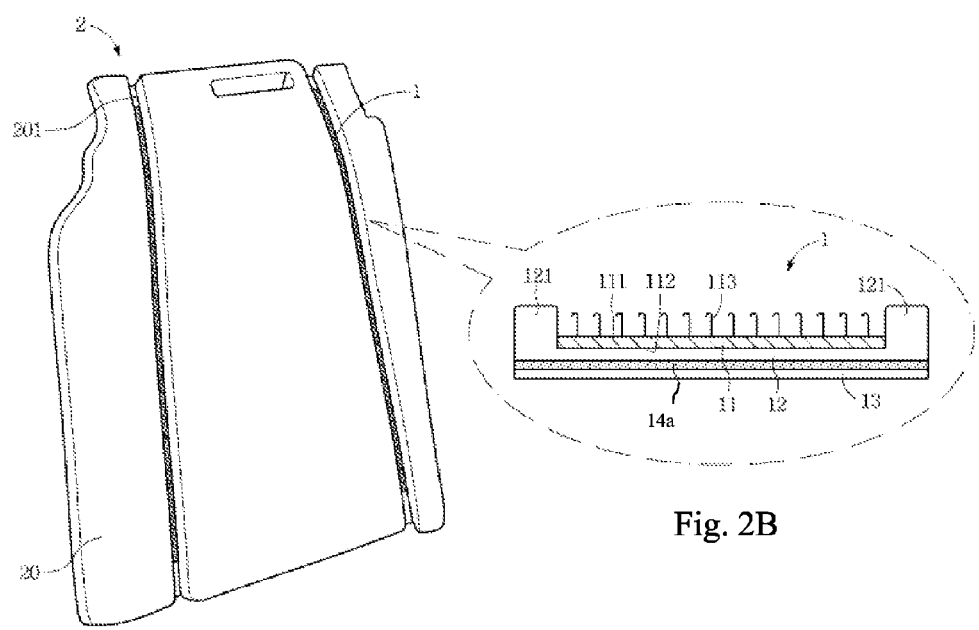
Fig. 2B
Fig. 2A

FASTENING ASSEMBLY AND CUSHION HAVING FASTENING ASSEMBLY

This application is a Continuation in-part of U.S. patent application Ser. No. 12/425,151 entitled "FASTENING ASSEMBLY AND CUSHION HAVING FASTENING ASSEMBLY" filed on Apr. 16, 2009 now abandoned which claimed a foreign priority of TW 097150797, filed on Dec. 26, 2008.

BACKGROUND OF THE INVENTION

1. Technical Field

The present invention relates to a fastening assembly and, more particularly, to a fastening assembly co-molded with a foam article.

2. Description of Related Art

The conventional hook-and-loop fastener was invented by George de Mestral, a Swiss engineer, under the inspiration of burrs. The hook-and-loop fastener consists of a hook side woven with tiny hooks and a loop side covered with even smaller and finer loop-like fastening structures. When the hook side and the loop side are pressed together, the hooks on the hook side are caught in the loop-like fastening structures on the loop side so that the two sides are fastened together.

In recent years, the hook-and-loop fastener, which is easily assembled and detached, is often coupled and used with other articles. When a hook-and-loop fastener is applied to a foam article such as a seat cushion, a buffer pad, and so on, the hook-and-loop fastener is bonded to the foam article with the hooks of the hook-and-loop fastener facing outward so as to fasten with another article having a corresponding loop side. Typically, a seat cushion with a hook-and-loop fastener is manufactured by placing the hook-and-loop fastener at a predetermined location in a mold and introducing a foam material into the mold. The foam material is co-molded with the hook-and-loop fastener and, when completely set, takes on the shape defined by the mold.

However, while the foam material expands, the expanding foam material tends to cover the hooks of the hook-and-loop fastener so that, after the foaming process is completed, the hooks of the hook-and-loop fastener of the final product cannot fasten with corresponding fastening structures. In other words, the final product is defective and results in waste of production cost. To overcome the aforesaid drawback, it was disclosed in U.S. Pat. No. 5,061,540 to equip the hook-and-loop fastener with flexible sealing portions for preventing the foam material from entering in between the hooks during the foaming process. Nevertheless, the hook-and-loop fastener protected by the above-cited patent must be used with a special mold. If the hook-and-loop fastener is placed merely on a planar surface of an ordinary mold without the dedicated trough for receiving the hook-and-loop fastener, the sealing portions provide no protection to the hooks.

BRIEF SUMMARY OF THE INVENTION

In order to remedy the aforesaid shortcoming of the prior art, an objective is to provide a fastening assembly comprising a magnetic material which enables the fastening assembly to be readily secured in position to a mold by magnetic force during a foaming molding process and easily detached from the mold after the foaming molding process is completed.

It is another objective to provide a fastening assembly comprising a first band flanked with sidewalls. The two sidewalls protect hooks of the fastening assembly from being invaded and damaged by a foam material during a foaming molding process. In addition, the sidewalls are made of a sponge material capable of absorbing an excess of the foam material so as to provide enhanced protection to the hooks.

According to above objectives, the present invention provides a fastening assembly essentially comprising a first band, a second band, and a third band. The first band has a first surface and a second surface, wherein the first surface is protrudingly provided with a plurality of hooks and the second surface is provided with a magnetic layer. The second band is made of a sponge material and provided lengthwise with a central concave portion and bilaterally with a pair of sidewalls. The central concave portion is located between the sidewalls and receives the first band such that the second surface of the first band faces the central concave portion of the second band. The central concave portion has a depth greater than a thickness of the first band and the hooks. The third band is coated with a magnetic layer and bonded to a bottom surface of the second band such that the magnetic layer is disposed between the second band and the third band.

In the present invention, the materials for the pair of sidewalls of the second band are different between that for the third band. Preferably, the sidewalls of the second band are made of sponge material, and the third band is made of a material that is tougher than the material used for the second band, such as a non-woven material, a fibrous material, or even a plastic film. In other words, the materials for the sidewalls are softer than that for the third band. In this way, the sidewalls of the second band are slightly compressed when the fastening assembly is upside down.

According to above objectives, the present invention also provides a cushion having a fastening assembly. The cushion comprises a foam cushion body and a fastening assembly, wherein the foam cushion body and the fastening assembly are molded into one piece, in which the foam cushion body further formed with a groove for receiving the fastening assembly. The fastening assembly includes a first band, a second band, and a third band that are same as described in the above. The groove is engaged with the third band and the sidewalls of the second band of the fastening assembly to provide securer engagement between the foam cushion body and the fastening assembly.

When the fastening assembly is upside down and magnetically adhered to a foaming mold, the third band is capable of making the sidewalls of the second band being slightly compressed due to the gravity and the toughness of the third band, and the magnetic force of the magnetic attraction between the magnetic layer and the magnet installed inside the foaming mold is larger enough to make the pair of sidewalls be further compressed and thus create a sealing effect for the enclosure of the hooks. It is therefore ensured that the foam material is prevented from penetrating into the enclosure and damaging the hooks.

BRIEF DESCRIPTION OF THE SEVERAL VIEWS OF THE DRAWINGS

The invention as well as a preferred mode of use, further objectives and advantages thereof will be best understood by referring to the following detailed description of illustrative embodiments in conjunction with the accompanying drawings, wherein:

FIG. 1E is a sectional view of the fastening assembly according to the first embodiment of the present invention when placed in a mold;

FIG. 2A is a perspective view of a cushion having a fastening assembly according to a first embodiment of the present invention; and FIG. 2B is an enlarged sectional view of the fastening assembly according to the first embodiment of the present invention.

DETAILED DESCRIPTION OF THE INVENTION

Disclosed herein are a fastening assembly and a cushion having the fastening assembly. Since the physical principles involved in the present invention and the basic connection relations among related elements are well known to persons of ordinary skill in the art, a detailed description of such principles and relations is omitted herein. Besides, the drawings referred to in the following description are not drawn according to actual dimensions and need not be so because they are only intended to demonstrate features of the present invention schematically.

Figure 1A:
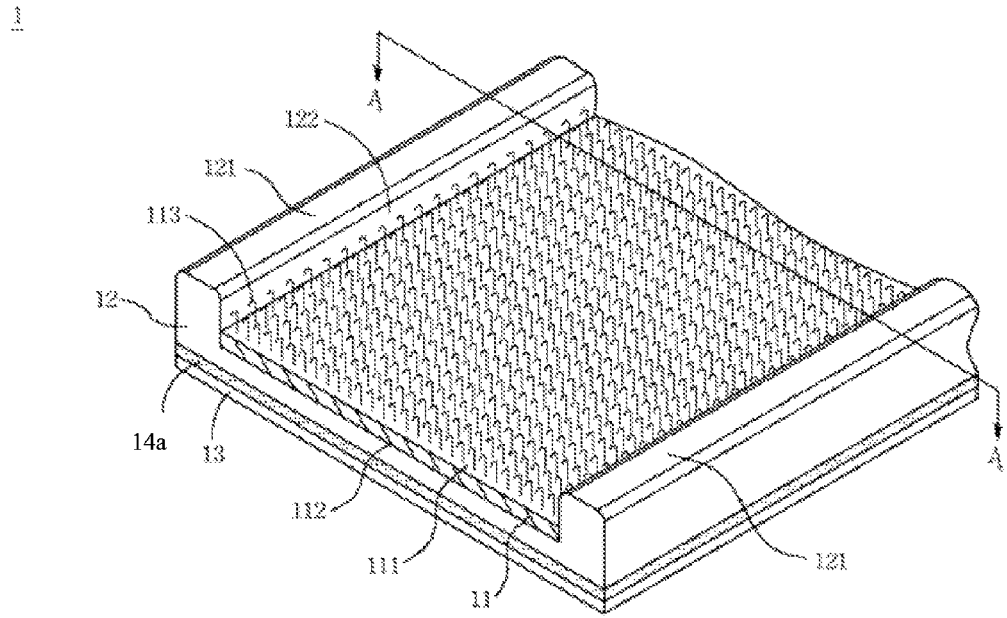
FIG. 1A is a perspective view of a fastening assembly according to a first embodiment of the present invention.
Figure 1B:
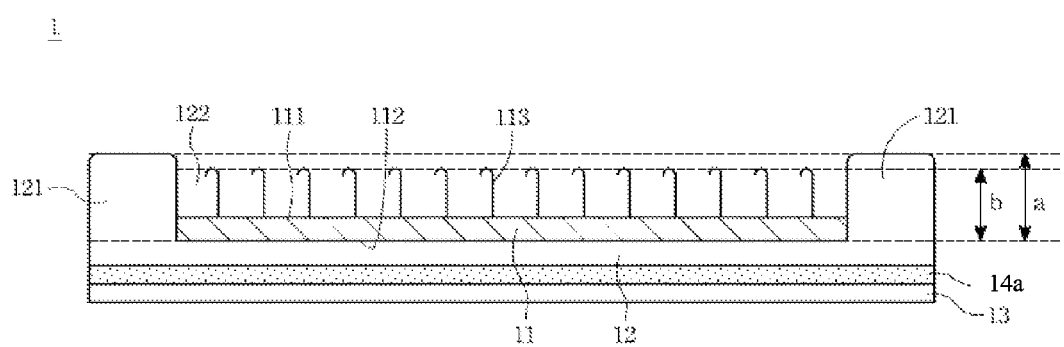
FIG. 1B is a sectional view of the fastening assembly according to the first embodiment of the present invention.

Please refer to FIG. 1A is a perspective view of a fastening assembly 1 according to a first embodiment of the present invention and FIG. 1B is a sectional view of the fastening assembly 1 taken along line AA of FIG. 1A. The fastening assembly 1 comprises a first band 11, a second band 12, and a third band 13. The first band 11 has a first surface 111 and a second surface 112, wherein the first surface 111 is protrudingly provided with a plurality of hooks 113. The second band 12 is made of a sponge material and provided lengthwise with a central concave portion 122 and bilaterally with a pair of sidewalls 121. The central concave portion 122 is located between the sidewalls 121. The first band 11 is placed in the central concave portion 122 with the second surface 112 on a top surface of the central concave portion 122 of the second band 12. In other words, the second surface 112 of the first band 11 faces the central concave portion 122. The depth of the central concave portion 122 counting from the top surface of the central concave portion 122 of the second band 12 to a top surface of the sidewalls 121 is defined as "a" in FIG. 1B. The thickness of the first band 11 plus the thickness of the hooks 113 are defined as "b" in FIG. 1B. It is designed such that "a" is greater than "b".

The third band 13 has a surface evenly coated with a magnetic layer 14a and bonded to a bottom surface of the second band 12. In other words, the magnetic layer 14a is disposed between the second band 12 and the third band 13. The third band 13 will be engaged with a foam material formed in a subsequent foaming molding process. The third band 13 prevents the first band 11 and the second band 12 from being deformed during the subsequent foaming molding process and therefore supports and reinforces the fastening assembly 1. Preferably, the third band 13 is made of a material that is tougher than the material used for the second band 12, such as a non-woven material, a fibrous material, or even a plastic film.

Figure 1C:
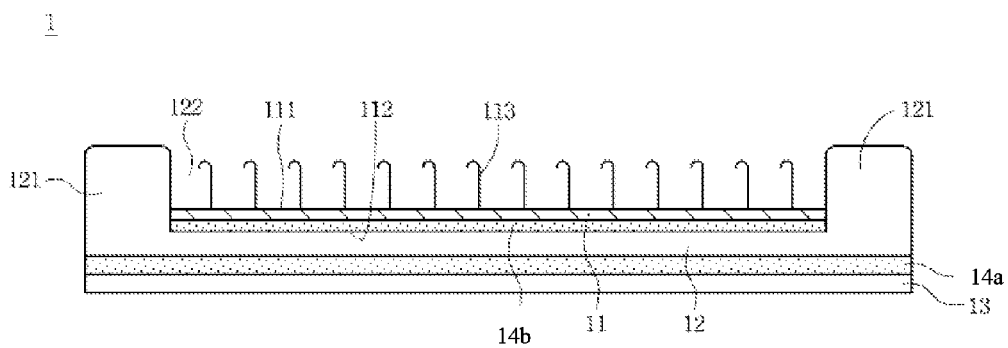
FIG. 1C is a sectional view of a fastening assembly according to a second embodiment of the present invention.
Figure 1D:
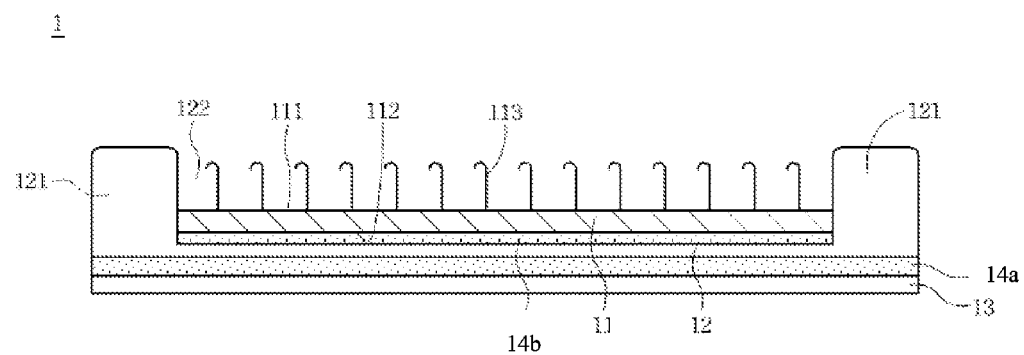
FIG. 1D is a sectional view of a fastening assembly according to a third embodiment of the present invention.

Please refer to FIGS. 1C, 1D and 1E, the magnetic layer 14a is disposed between the second band 12 and the third band 13 such that the magnetic attraction between the magnetic layer 14a and a magnet 31 installed in a foaming mold 3 enables the second band 12 to be firmly adhered to the foaming mold 3 in a foaming molding process in which the third band 13 is to be engaged with a foam material. To increase the magnetic attraction between the magnetic layer 14a and the magnet 31 installed in the foaming mold 3, an another magnetic layer 14b is further provided between the second surface 112 of the first band 11 and the top surface of the central concave portion 122 of the second band 12.

The magnetic layer 14b can be provided in different ways. In one example, as shown in FIG. 1C, the magnetic layer 14b is evenly coated on the second surface 112 of the first band 11. In another example, as shown in FIG. 1D, the magnetic layer 14b is evenly coated on the top surface of the central concave portion 122 of the second band 12. The magnetic layers 14a and 14b are preferably in the form of powder to enable uniform magnetic attraction. Preferably, the magnetic layers 14a and 14b are in form of iron powder or ferrous alloy powder.

Referring to FIG. 1E, a foaming mold 3 is equipped with a magnet 31 at a predetermined location for magnetically attracting the fastening assembly 1. The foaming mold 3 is formed with a cave to accommodating the magnet 31 to the extent that the top surface of the foaming mold 3 and the top surface of the magnet 31 are substantially on the same level.

During the foaming molding process, the fastening assembly 1 is upside down and placed on the top surface of the magnet 31. The magnetic layer 14a is magnetically attracted to the magnet 31 of the foaming mold 3, and thus the fastening assembly 1 is adhered magnetically to the top surface of the foaming mold 3, so that the plurality of hooks 113 provided on the first surface 111 of the first band 11 are enclosed by the top surface of the foaming mold 3 and the sidewalls 121 of the second band 12. In this way, the sidewalls 121 of the second band 12 prevent the foam material (not shown) from penetrating into the enclosure and from damaging the hooks 113. The number, shape, or location of the magnet 31 of the foaming mold 3 is not limited as long as the fastening assembly 1 can be magnetically adhered to the top surface of the magnet 31.

In the present invention, the materials for the pair of sidewalls 121 of the second band 12 is different between that for the third band 13. Preferably, the sidewalls 121 of the second band 12 are made of sponge material, and the third band 13 is made of a material that is tougher than the material used for the second band 12, such as a non-woven material, a fibrous material, or even a plastic film. In other words, the materials for the sidewalls 121 are softer than that for the third band 13. When the fastening assembly 1 is upside down and magnetically adhered to the foaming mold 3, the third band 13 is capable of making the sidewalls 121 being slightly compressed due to the gravity and the toughness of the third band 13, and the magnetic force of the magnetic attraction between the magnetic layer 14a and the magnet 31 is larger enough to make the pair of sidewalls 112 be further compressed and thus create a sealing effect for the enclosure of the hooks 113. It is therefore ensured that the foam material (not shown) is prevented from penetrating into the enclosure and damaging the hooks 113.

Besides the foregoing fastening assembly in the above embodiments, the present invention also provides a cushion having a fastening assembly.

Referring to FIG. 2A, which is a perspective view of a cushion 2 having a fastening assembly 1 according to a first embodiment of the present invention, the cushion 2 comprises a foam cushion body 20 and at least one fastening assembly 1, wherein the foam cushion body 20 and the fastening assembly 1 are molded into one piece in a foaming molding process. Referring to FIG. 2B, which is an enlarged sectional view of the fastening assembly 1 of FIG. 2A, the fastening assembly 1 is identical to the one disclosed above according to the first embodiment of the present invention as shown in FIG. 1B, and therefore is not described repeatedly herein. In addition, the foam cushion body 20 is formed with at least one groove 201 to receive the fastening assembly 1 and be engaged with the third band 13 of the fastening assembly 1 and even the pair of sidewalls 121 of the second band 12 to provide securer engagement between the foam cushion body 20 and the fastening assembly 1. In this way, the cushion 2 is allowed to engage other articles such as leather bolster of a seat cushion or a backrest of a chair having fastening structures corresponding to that of the fastening assembly 1.

The present invention is herein illustrated by reference to the preferred embodiments and the corresponding drawings to enable one skilled in the art to carry out the present invention. However, the embodiments are provided for illustrative purposes only but not intended to limit the scope of the present invention. In other words, changes or modifications which are made to the disclosed embodiments without departing from the spirit of the present invention should fall within the scope of the present invention, which is defined only by the appended claims.

What is claimed is:

1. A fastening assembly, comprising :
    a first band having a first surface and a second surface, the first surface being protrudingly provided with a plurality of hooks, the second surface being provided with a first magnetic layer;
    a second band made of a sponge material and provided lengthwise with a central concave portion and bilaterally with a pair of sidewalls, the central concave portion being located between the sidewalls, the first band being placed in the central concave portion of the second band with the first magnetic layer facing the central concave portion of the second band; and
    a third band coated with a second magnetic layer and bonded to a bottom surface of the second band, the third band being tougher than the second band, the second magnetic layer being disposed between the second band and the third band;
    wherein the central concave portion has a depth greater than a thickness of the first band and the hooks;
    wherein the first magnetic layer and the second magnetic layer are in form of ferrous alloy powder; and
    wherein the sidewalls of the second band are slightly compressed when the fastening assembly is upside down.

2. The fastening assembly as claimed in claim 1, wherein the third band is made of a non-woven material.

3. The fastening assembly as claimed in claim 1, wherein the third band is made of a fibrous material.

4. The fastening assembly as claimed in claim 1, wherein the third band is made of a plastic film.

5. A cushion , comprising:
    a foam cushion body formed with a groove; and
    a fastening assembly being received in the groove and being molded into one piece with the foam cushion body, the fastening assembly comprising:
        a first band having a first surface and a second surface, the first surface being protrudingly provided with a plurality of hooks, the second surface being provided with a first magnetic layer;
        a second band made of a sponge material and provided lengthwise with a central concave portion and bilaterally with a pair of sidewalls, the central concave portion being located between the sidewalls, the first band being placed in the central concave portion of the second band with the first magnetic layer facing the central concave portion of the second band; and
        a third band coated with a second magnetic layer and bonded to a bottom surface of the second band, the third band being tougher than the second band, the second magnetic layer being disposed between the second band and the third band;
        wherein the central concave portion has a depth greater than a thickness of the first band and the hooks;
        wherein the first magnetic layer and the second magnetic layer are in form of ferrous alloy powder; and
        wherein the sidewalls of the second band are slightly compressed when the fastening assembly is upside down.

6. The cushion as claimed in claim 5, wherein the groove is engaged with the third band and the sidewalls of the second band of the fastening assembly.

\* \* \* \* \*